US009562555B1

(12) United States Patent
Talbot et al.

(10) Patent No.: US 9,562,555 B1
(45) Date of Patent: Feb. 7, 2017

(54) FASTENER ASSEMBLY

(71) Applicant: Infinite Technologies, Inc., Folsom, CA (US)

(72) Inventors: Casey Aaron Talbot, South Jordan, UT (US); Andrew W. Gill, Salt Lake City, UT (US); Robert Brian Spencer, Highland, UT (US); John D. Taylor, Salt Lake City, UT (US); Kevin A. Spencer, Columbus, IN (US)

(73) Assignee: Infinite Technologies, Inc., Folsom, CA (US)

( * ) Notice: Subject to any disclaimer, the term of this patent is extended or adjusted under 35 U.S.C. 154(b) by 147 days.

(21) Appl. No.: 14/521,906

(22) Filed: Oct. 23, 2014

Related U.S. Application Data

(60) Provisional application No. 61/993,855, filed on May 15, 2014.

(51) Int. Cl.
  *F16B 5/10* (2006.01)
  *F16B 19/00* (2006.01)
  *F16B 5/00* (2006.01)

(52) U.S. Cl.
  CPC ............ *F16B 19/002* (2013.01); *F16B 5/00* (2013.01); *F16B 5/10* (2013.01)

(58) Field of Classification Search
  CPC ............ F16B 21/02; F16B 21/04; F16B 5/10; F16B 5/0208
  USPC .................. 411/349, 549, 552, 553
  See application file for complete search history.

(56) References Cited

U.S. PATENT DOCUMENTS

| 847,253 | A | * | 3/1907 | Iversen | A41F 1/00 |
| | | | | | 24/578.12 |
| 2,373,722 | A | * | 4/1945 | Von Opel | F16B 5/10 |
| | | | | | 220/243 |
| 2,476,339 | A | * | 7/1949 | Von Opel | F16B 5/10 |
| | | | | | 411/349 |
| 2,691,199 | A | * | 10/1954 | Schlueter | F16B 5/10 |
| | | | | | 411/551 |
| 4,101,232 | A | * | 7/1978 | Haapala | A21C 15/002 |
| | | | | | 403/197 |
| 4,207,655 | A | * | 6/1980 | MacMaster | F16B 5/10 |
| | | | | | 292/62 |

(Continued)

OTHER PUBLICATIONS

Fairchild Fasteners, "Panel Fasteners," product brochure, 2001.
ANEMO Engineering Bvba, "Camlock Quick-Operating Fasteners," product catalog, Feb. 2008.

*Primary Examiner* — Flemming Saether
(74) *Attorney, Agent, or Firm* — Stites & Harbison, PLLC; David W. Nagle, Jr.; James R. Hayne

(57) ABSTRACT

A fastener assembly includes an insert having a head and a sleeve extending from a bottom surface of the head, with the insert further defining an internal cavity. The head of the insert abuts a first panel with the sleeve extending through a first preformed hole in the first panel. A second panel with a second preformed hole is aligned with the first panel, and a shaft of a fastener pin is inserted through the second preformed hole and into the internal cavity of the insert. Upon rotating the fastener pin, a tee portion at the end of the shaft engages a seat positioned in the internal cavity of the insert. The fastener assembly also includes a compression member positioned around the shaft of the fastener pin that biases the tee portion of the fastener pin into engagement with the seat of the insert.

8 Claims, 5 Drawing Sheets

(56) References Cited

U.S. PATENT DOCUMENTS

| | | | | |
|---|---|---|---|---|
| 5,290,131 | A * | 3/1994 | Henriksen | F16B 37/145 |
| | | | | 411/180 |
| 6,343,709 | B1 * | 2/2002 | DeForrest | B65D 43/022 |
| | | | | 220/327 |
| 6,829,879 | B2 * | 12/2004 | Weichholdt | A01F 12/40 |
| | | | | 460/112 |
| 6,988,863 | B2 * | 1/2006 | Hulin | F16B 21/09 |
| | | | | 411/3 |
| 7,537,409 | B2 * | 5/2009 | Huhnerbein | F16B 12/2009 |
| | | | | 403/348 |
| 8,333,605 | B2 * | 12/2012 | McQuilken | H01R 13/62 |
| | | | | 439/332 |
| 2015/0248975 | A1 * | 9/2015 | Bonfanti | H01H 9/285 |
| | | | | 200/50.28 |

* cited by examiner

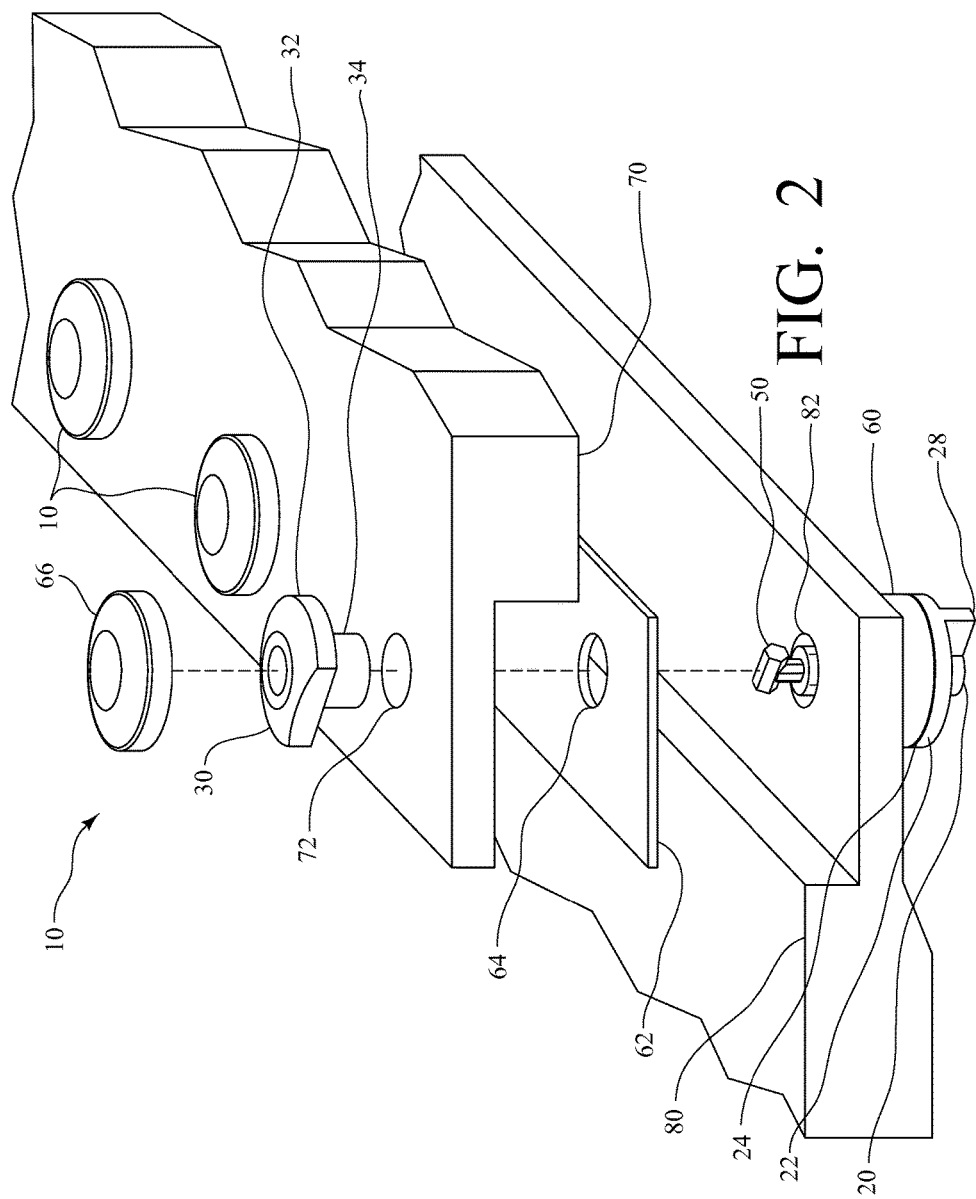

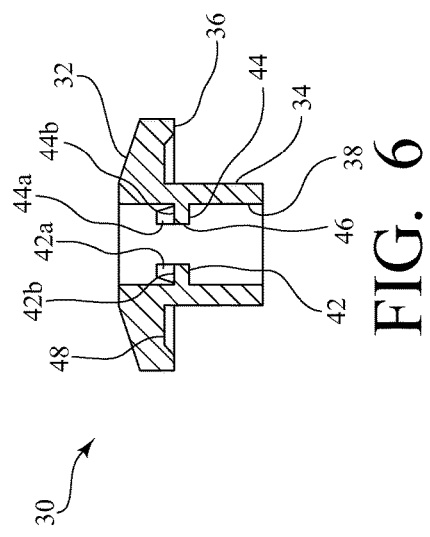
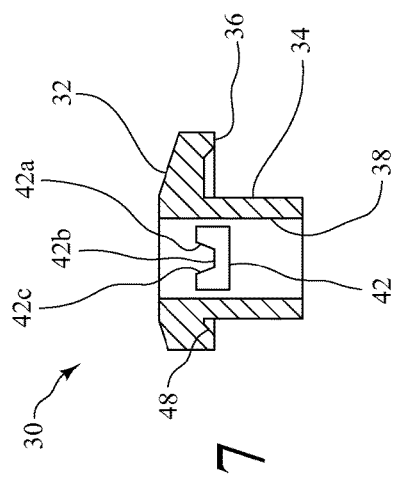
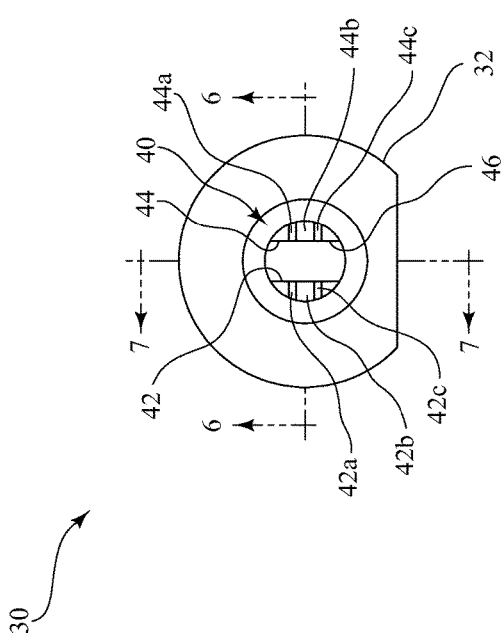
FIG. 6
FIG. 7
FIG. 5

FASTENER ASSEMBLY

CROSS-REFERENCE TO RELATED APPLICATIONS

The present application claims priority to U.S. Provisional Patent Application Ser. No. 61/993,855 filed on May 15, 2014, the entire disclosure of which is incorporated herein by reference.

STATEMENT REGARDING FEDERALLY SPONSORED RESEARCH OR DEVELOPMENT

This invention was made with government support under Contract No. FA8222-12-C-0007 awarded by the United States Air Force. The government has certain rights in the invention.

BACKGROUND OF THE INVENTION

The present invention relates to a fastener assembly, a fastener assembly that has particular applicability and utility in the installation of radome panels.

A radome is an enclosure designed to protect radar antennas from outside weather and debris. A typical ground-based radome is constructed of a multitude of panels formed into a spherical enclosure. Each of the panels is connected by a plurality of fasteners, such that a typical 55-foot diameter radome may have more than 6,000 fasteners. Each fastener in a radome must be tightened to a specified torque value to ensure proper connection, and this requires extensive man-hours for fastener installation alone. By some estimates, each fastener takes about a minute to install, leading to over 100 man-hours for fastener installation alone in a typical 55-foot diameter radome.

In current installations, radome panels are often connected by a common nut-and-bolt fastener. A nut-and-bolt fastener requires a user to secure either the nut or the bolthead in place while tightening the other. However, in some situations, an adhesive is applied to the nut portion of the fastener to hold it in place while the bolt is tightened.

Nut-and-bolt fasteners are also likely to loosen over time, requiring even more man-hours in fastener inspection, along with the need for re-torqueing the fasteners over the life of the radome. When maintenance is required, if the adhesive bond on the nut is broken, the fastener may merely spin in place rather than tighten. In such a situation, depending on the configuration of the connection (e.g., the nut and bolt are on opposite sides of the radome panels), re-torqueing or removal of the fastener may require substantially more time, as simultaneous access to both portions of the fastener is not possible.

Thus, there remains a need for an improved fastener assembly which can be quickly installed and requires access to only one side of the adjacent radome panels.

SUMMARY OF THE INVENTION

The present invention is a fastener assembly that has particular applicability and utility in the installation of radome panels.

The fastener assembly of the present invention is comprised of a fastener pin, an insert, and a compression member. The fastener pin is comprised of a base, a shaft that extends from a top surface of the base and includes a tee portion at or near its distal end. The insert is comprised of a head and a sleeve which extends from a bottom surface of the head with an internal cavity that extends through both the sleeve and the head of the insert. A seat is located within the internal cavity that includes a first portion located on one side of the internal cavity and a second portion located on the opposite side of the internal cavity, such that a slot is defined between the first and second portions. The slot is dimensioned such that the tee portion of the fastener pin can pass through the slot during installation.

In some embodiments, the first and second portions of the seat each define an engagement surface having first and second ramped portions and a bottom portion that extends between the two ramped portions. In addition, the tee portion of the shaft of the fastener pin has a hexagonal cross section with six lateral surfaces, such that the three lower surfaces of the tee portion engage the three portions of the engagement surface of the first and second portions of the seat when the fastener assembly is fully installed.

The exemplary fastener assembly is installed by first connecting the insert to a first panel by inserting the sleeve of the insert into a first preformed hole of the first panel, with the bottom surface of the head of the insert abutting the upper surface of the first panel and a distal end of the sleeve protruding from the first preformed hole of the first panel.

A compression member is positioned around the shaft of the fastener pin and adjacent to the top surface of the base of the fastener pin, and the shaft of the fastener pin is inserted into the second preformed hole of the second panel and into the internal cavity defined by the insert. To this end, the tee portion of the fastener pin is first aligned with the slot defined by the seat of the insert such that the tee portion passes through the slot when the shaft of the fastener pin is inserted into the internal cavity defined by the insert. As the fastener pin is inserted into the second preformed hole of the second panel and into the internal cavity defined by the insert, the compression member is compressed between the top surface of the base of the fastener pin and the lower surface of the second panel. It is contemplated that the thickness of the compression member is determined prior to installation based on the thickness of the first and second panels in order for the compression member to provide a desired pre-load force.

After the tee portion of the fastener pin passes completely through the slot defined by the seat, the fastener pin is then rotated one-quarter turn, such that the tee portion of the fastener pin is aligned with the engagement surfaces of the first and second portions of the seat. To this end, the fastener pin may include two wings that extend from a lower surface of the base, which facilitate rotation of the fastener pin without the use of a tool.

After the fastener pin is rotated one-quarter turn, the fastener pin is released, and the compression member biases the tee portion of the fastener pin into engagement with the seat. At this point, the compression member is still partially compressed between the top surface of the base of the fastener pin and the lower surface of the second panel, and the compression member continuously applies a biasing force which keeps the tee portion of the fastener pin secured in the seat. As a further refinement, in some exemplary embodiments, it is contemplated that the compression member serves as a gasket to provide a substantially watertight seal between the base of the fastener and the second panel.

The fastener assembly thus advantageously provides for quick and reliable connection of the first and second panels. The unique configuration of the tee portion of the fastener pin allows the fastener pin to be installed by hand. Furthermore, the interconnection of the tee portion of the fastener pin and the seat of the insert, along with the compression member, provides a desired pre-load without the use of calibrated torqueing devices. Furthermore, there is no need to re-torque the fastener assembly over time to maintain the desired pre-load.

In some embodiments, after the insert has been installed in the first preformed hole of the first panel, a panel gasket is positioned adjacent to the first panel with a hole defined through the panel gasket positioned around the distal end of the sleeve of the insert. When the second panel is then brought into position adjacent to the first panel, the panel gasket is positioned between first panel and the second panel and provides a substantially watertight seal between the first and second panels. Of course, in most cases, the first and second panels are joined by a plurality of fastener assemblies, and so the panel gasket is configured to run substantially the entire length of the connection between the first and second panels, with the panel gasket defining multiple holes that correspond to the positions of the fastener assemblies.

Although the fastener assembly has particular applicability and utility in the installation of radome panels, the fastener assembly could also be used to connect any objects having suitable geometries.

DESCRIPTION OF THE DRAWINGS

FIG. 2 is an exploded perspective view of one of the exemplary fastener assemblies of FIG. 1 prior to installation;

FIG. 5 is a top view of the insert of the exemplary fastener assembly of FIG. 1 shown in isolation;

FIG. 6 is a side sectional view of the insert of FIG. 5 taken along the line 6-6 of FIG. 5;

FIG. 7 is a side sectional view of the insert of FIG. 5 taken along the line 7-7 of FIG. 5;

DETAILED DESCRIPTION OF THE INVENTION

Figure 1:
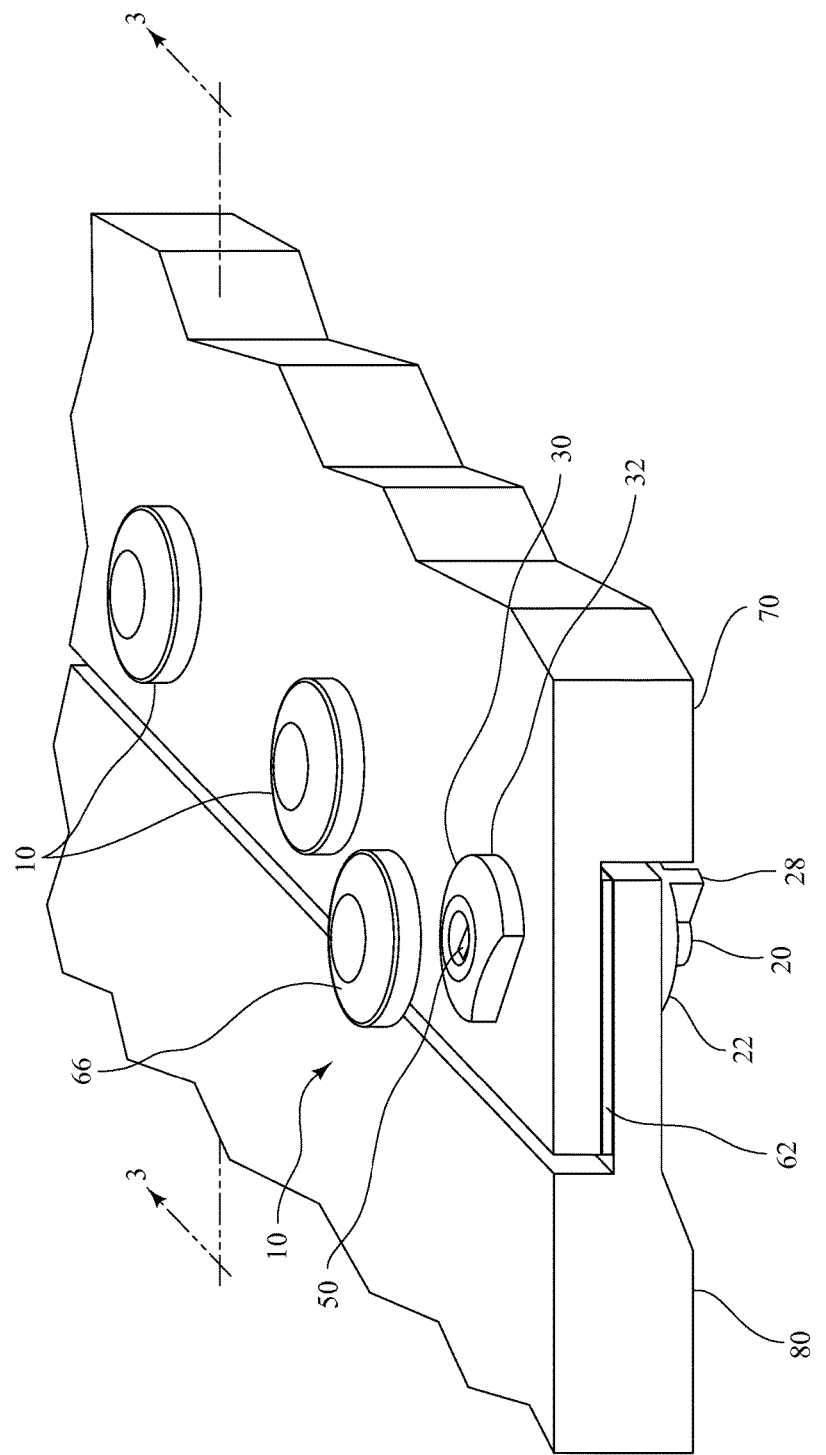
FIG. 1 is a perspective view of a plurality of exemplary fastener assemblies made in accordance with the present invention shown joining a first (overlap) panel and a second (underlap) panel, and with the cap of one of the fastener assemblies removed.

The present invention is a fastener assembly that has particular applicability and utility in the installation of radome panels.

As shown in FIGS. 1-6, an exemplary fastener assembly 10 made in accordance with the present invention comprises a fastener pin 20, an insert 30, and a compression member 60. In some embodiments, the fastener assembly 10 may also include a panel gasket 62 and a cap 66, as further described below.

Figure 8:
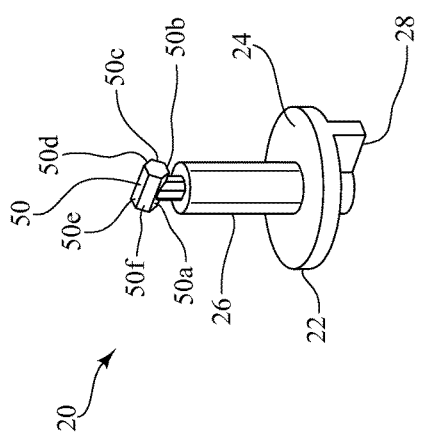
FIG. 8 is a perspective view of the fastener pin of the exemplary fastener assembly of FIG. 1 shown in isolation.

Referring now to FIG. 8, in this exemplary embodiment, the fastener pin 20 is comprised of a base 22, a shaft 26 that extends from a top surface 24 of the base 22, and two wings 28 that extend from a lower surface of the base 22, as further described below. The shaft 26 of the fastener pin 20 terminates in a tee portion 50, the function of which will also be described below.

With respect to FIG. 8, the shaft 26 is described as including a tee portion 50 because there are two lateral extensions (or wings) at or near a distal end of the shaft 26 that are substantially perpendicular to the longitudinal axis of the shaft 26, thus forming the "crossbar" of a T-shape, while a reduced-diameter segment that is aligned with the longitudinal axis of the shaft 26 serves as the "stem" of the T-shape. However, the tee portion 50 could include more than two lateral extensions (or wings) without departing from the spirit and scope of the present invention. For example, three lateral extensions could be arranged at 120° intervals, or four lateral extensions could be arranged at 90° intervals. Furthermore, in some embodiments, it is contemplated that such a tee portion 50 could be formed from lateral extensions (or wings) that extend from the surface of the shaft 26 without the need for any separate reduced-diameter segment to serve as a "stem" of the T-shape.

Referring now to FIGS. 5-7, in this exemplary embodiment, the insert 30 is comprised of a head 32 and a sleeve 34 which extends from a bottom surface 36 of the head 32. As shown in FIG. 5, the head 32 of the insert 30 is substantially circular when viewed from above except for a flattened portion along a lateral surface of the head 32, which is an artifact of the manufacturing method and is not considered important to the functionality of fastener assembly 10 of the present invention.

Referring still to FIGS. 5-7, the insert 30 defines an internal cavity 38 that extends through both the sleeve 34 and the head 32 of the insert 30. A seat 40 is located within the internal cavity 38 and is configured to engage the tee portion 50 of the fastener pin 20, as further described below. The seat 40 includes a first portion 42 that is located on one side of the internal cavity 38 and a second portion 44 that is located on the opposite side of the internal cavity 38, such that a slot 46 is defined between the first and second portions 42, 44 of the seat 40. The slot 46 is dimensioned such that the tee portion 50 of the fastener pin 20 can pass through the slot 46 during installation, as further described below.

As perhaps best shown in FIG. 7, the first portion 42 of the seat 40 defines an engagement surface having first and second ramped portions 42a, 42c and a bottom portion 42b that extends between the two ramped portions 42a, 42c. The second portion 44 of the seat 40 similarly defines an engagement surface having first and second ramped portions 44a, 44c and a bottom portion 44b that extends between the two ramped portions 44a, 44c. As perhaps best shown in FIG. 5, each of the three portions 42a-c of the engagement surface of the first portion 42 of the seat 40 are substantially aligned with a respective portion 44a-c of the engagement surface of the second portion 44 of the seat 40, such that the engagement surfaces of the first and second portions 42, 44 of the seat 40 may be considered one engagement surface defined by both the first portion 42 and the second portion 44 of the seat 40, with the slot 46 defined in the middle of the engagement surface of the seat 40.

As mentioned above, the tee portion 50 could include more than two lateral extensions (or wings) without departing from the spirit and scope of the present invention, in which case the seat 40 could include additional portions defining engagement surfaces for these additional lateral extensions (or wings).

Referring once again to FIG. 8, in this exemplary embodiment, the tee portion 50 of the shaft 26 of the fastener pin 20 has a hexagonal cross section with six lateral surfaces 50a-f. The tee portion 50 includes a lowermost lateral surface 50b that is substantially parallel to the top surface 24 of the base 22 of the fastener pin 20, and on each side of the lowermost lateral surface 50b is a lower side lateral surface 50a, 50c. The lowermost lateral surface 50b is configured to engage the bottom portions 42b, 44b of the first and second portions 42, 44 of the seat 40, while the lower side lateral surfaces 50a, 50c are configured to engage the ramped portions 42a, 42c, 44a, 44c of the first and second portions 42, 44 of the seat 40. Accordingly, when the tee portion 50 of the fastener pin 20 engages the seat 40, the three lower laterals surfaces 50a-c of the tee portion 50 engage the three portions 42a-c of the engagement surface of the first portion 42 of the seat 40 and the three portions 44a-c of the engagement surface of the second portion 44 of the seat 40.

Figure 4:
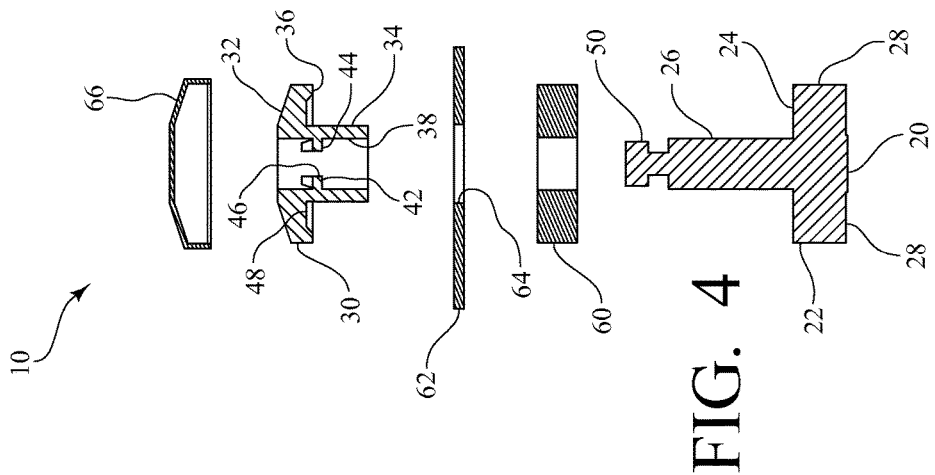
FIG. 4 is an exploded side sectional view of the fastener assembly of FIG. 3.
Figure 3:
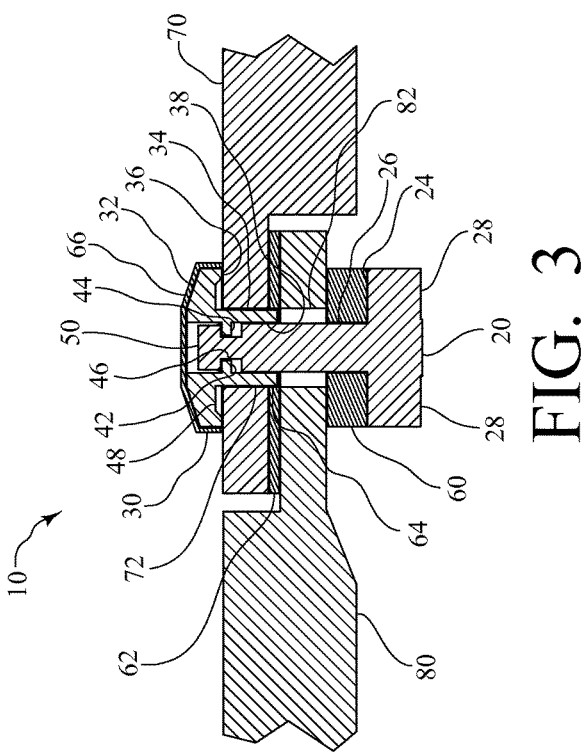
FIG. 3 is a side sectional view of one of the exemplary fastener assemblies of FIG. 1 taken along the line 3-3 of FIG. 1.

Referring now to FIGS. 2-4, the exemplary fastener assembly 10 is installed by first connecting the insert 30 to a first panel 70 by inserting the sleeve 34 of the insert 30 into a first preformed hole 72 of the first panel 70, with the bottom surface 36 of the head 32 of the insert 30 abutting the upper surface of the first panel 70. As shown in FIG. 3, when the bottom surface 36 of the head 32 abuts the upper surface of the first panel 70, a distal end of the sleeve 34 protrudes from the first preformed hole 72 of the first panel 70.

It is contemplated that the insert 30 may be pre-installed into the first panel 70, for example, as part of the manufacture of the first panel 70. Alternatively, the insert 30 may be installed immediately prior to assembly of the first panel 70 to another panel. In either event, it is contemplated that the insert 30 is secured in place by an adhesive or similar means. To this end, in some embodiments of the present invention, the bottom surface 36 of the head 32 defines an annular cavity 48 which circumscribes the sleeve 34, such that, in use, the adhesive is received in the annular cavity 48 to secure the head 32 of the insert 30 to the first panel 70. Advantageously, it is contemplated that the adhesive provides a substantially watertight seal that prevents water from seeping between the insert 30 and the first panel 70. Furthermore, it is contemplated that the insert 30 is connected to the first panel 70 in a manner which prevents the insert 30 from rotating within the first preformed hole 72 of the first panel 70 during installation as well as throughout the operational life of the fastener assembly 10, as further described below.

Referring still to FIGS. 2-4, after the insert 30 is securely connected to the first panel 70, a panel gasket 62 is positioned adjacent to the first panel 70 with a hole 64 defined through the panel gasket 62 positioned around the distal end of the sleeve 34 of the insert 30. A second panel 80 is then brought into position adjacent to the first panel 70, such that a second preformed hole 82 defined by the second panel 80 is aligned with the first preformed hole 72 defined by the first panel 70, with the panel gasket 62 positioned between first panel 70 and the second panel 80. It is contemplated that the panel gasket 62 provides a substantially watertight seal between the first and second panels 70, 80. As shown in FIGS. 1 and 2, the first panel 70 and the second panel 80 are joined by a plurality of fastener assemblies 10. To this end, the panel gasket 62 is configured to run substantially the entire length of the connection between the first and second panels 70, 80, with the panel gasket 62 defining multiple holes (not shown) identical to the hole 64 shown in FIGS. 2-4 that correspond to the positions of the fastener assemblies 10.

Referring once again to FIGS. 2-4, a compression member 60 is positioned around the shaft 26 of the fastener pin 20 and adjacent to the top surface 24 of the base 22 of the fastener pin 20, and the shaft 26 of the fastener pin 20 is inserted into the second preformed hole 82 of the second panel 80 and into the internal cavity 38 defined by the insert 30. To this end, the tee portion 50 of the fastener pin 20 is first aligned with the slot 46 defined by the seat 40 of the insert 30, such that the tee portion 50 passes through the slot 46 when the shaft 26 of the fastener pin 20 is inserted into the internal cavity 38 defined by the insert 30. As the fastener pin 20 is inserted into the second preformed hole 82 of the second panel 80 and into the internal cavity 38 defined by the insert 30, the compression member 60 is compressed between the top surface 24 of the base 22 of the fastener pin 20 and the lower surface of the second panel 80. It is contemplated that the thickness of the compression member 60 is determined prior to installation based on the thickness of the first and second panels 70, 80 in order for the compression member 60 to provide a desired pre-load force, as further described below.

After the tee portion 50 of the fastener pin 20 passes completely through the slot 46 defined by the seat 40, the fastener pin 20 is then rotated one-quarter turn, such that the tee portion 50 of the fastener pin 20 is aligned with the three portions 42a-c of the engagement surface of the first portion 42 of the seat 40 and the three portions 44a-c of the engagement surface of the second portion 44 of the seat 40. To this end, the two wings 28 on the base 22 of the fastener pin 20 are configured to facilitate rotation of the fastener pin 20 without the use of a tool. Furthermore, as perhaps best shown in FIG. 8, the two wings 28 are aligned with the tee portion 50 such that the alignment of the tee portion 50 can be determined even when the tee portion 50 is not visible. As discussed above, it is contemplated that the insert 30 is connected to the first panel 70 in such a way that the insert 30 does not rotate along with the fastener pin 20 without requiring the use of a tool to hold the insert 30 in position relative to the fastener pin 20 (i.e., the adhesive used to secure the insert 30 to the first panel 70 is sufficient by itself to prevent the insert 30 from rotating).

As described above, in this exemplary embodiment, the fastener pin 20 is rotated one-quarter turn. However, the objective is to align the tee portion 50 of the fastener pin 20 with the engagement surfaces of the first portion 42 and the second portion 44 of the seat 40. In some embodiments, this could be accomplished by rotating the fastener pin 40 differing amounts (e.g., one-eighth turn or three-quarters turn), depending on how the slot 46 is oriented relative to the first portion 42 and the second portion 44 of the seat 40, without departing from the spirit and scope of the present invention.

In passing the tee portion 50 through the slot 46 defined by the seat 40, a force is applied to the base 22 of the fastener pin 20 to overcome a biasing force from the compression member 60. After the fastener pin 20 is rotated one-quarter turn, the fastener pin 20 is released (i.e., the force is no longer applied to the base 22 of the fastener pin 20), and the compression member 60 biases the tee portion 50 of the fastener pin 20 into engagement with the seat (i.e., the three portions 42a-c of the engagement surface of the first portion 42 of the seat 40 and the three portions 44a-c of the engagement surface of the second portion 44 of the seat 40). At this point, the compression member 60 is still partially compressed between the top surface 24 of the base 22 of the fastener pin 20 and the lower surface of the second panel 80, and it is contemplated that the compression member 60 continuously applies a biasing force which keeps the tee portion 50 of the fastener pin 20 secured in the seat 40. In this way, the compression member 60 provides a force which ensures a secure connection between the first and second panels 70, 80. As a further refinement, in some exemplary embodiments, it is contemplated that the compression member 60 serves as a gasket to provide a substantially watertight seal between the base 22 of the fastener pin 20 and the second panel 80.

The fastener assembly 10 thus advantageously provides for quick and reliable connection of the first and second panels 70, 80. The unique configuration of the tee portion 50 of the fastener pin 20 allows the fastener pin 20 to be installed by hand. Furthermore, the interconnection of the tee portion 50 of the fastener pin 20 and the seat 40 of the insert 30, along with the compression member 60, provides a desired pre-load without the use of calibrated torqueing devices. Furthermore, there is no need to re-torque the fastener assembly 10 over time to maintain the desired pre-load.

In the event that either the first or second panels 70, 80 needs to be removed, the fastener assembly 10 also provides for quick disassembly. Specifically, the first and second ramped portions 42a, 42c of the first portion 42 of the seat 40 and the first and second ramped portions 44a, 44c of the second portion 44 of the seat 44 are configured such that when the tee portion 50 of the fastener pin 20 is engaged in the seat 40 of the insert 30 (i.e., the fastener assembly 10 is installed), rotating the fastener pin 20 forces the lateral surfaces of the tee portion 50 to slide along the ramped portions of the first and second portion 42, 44 of the seat 40 forcing the tee portion 50 upwards and out of alignment with the engagement surfaces of the seat 40. Continued rotation of the fastener pin 20 will eventually align the tee portion 50 of the fastener pin 20 with the slot 46 defined by the first and second portions 42, 44 of the seat 40, so that the fastener pin 20 can be removed. The first and second panels 70, 80 may then be separated or removed as necessary.

As mentioned above and as shown in FIGS. 1-4, a cap 66 may also be installed over the head 32 of the insert 30. As described above, the internal cavity 38 defined by the insert 30 extends through both the sleeve 34 and the head 32 of the insert 30, which would allow water to pass freely through the internal cavity 38 of the insert 30. The cap 66 thus provides a seal for the fastener assembly 10, while maintaining a low profile. The low profile of the cap 66 allows the exterior of the first and second panels 70, 80 to be more easily cleaned. Specifically, snow and debris are less likely to collect on the exterior of the first panel 70 around the cap 66, and any snow and debris which does collect on the first panel 70 will be easier to remove.

Figure 9:
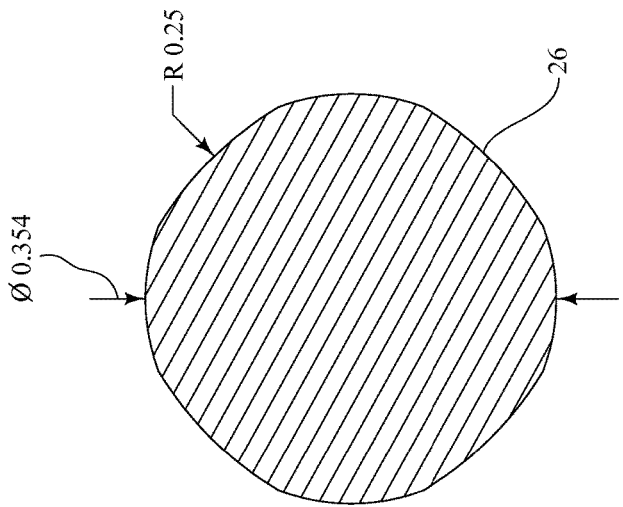
FIG. 9 is a cross sectional view of the shaft of the fastener pin of FIG. 8.

Referring now to FIG. 9, as a further refinement, in some exemplary embodiments, the shaft 26 of the fastener pin 20 does not have a circular cross-section, but rather has differing radii of curvature as illustrated by the dimensions provided in FIG. 9. The portions of the cross-section with a diameter of 0.354 inches are so dimensioned to closely mate with the inside surface of the internal cavity 38 of the insert 30. Because such portions closely mate with the internal cavity 38 of the insert 30, there is an increased bearing area, which substantially eliminates bending in the shaft 26 of the fastener pin 20 and increases shear capacity as compared to an arrangement with a "loose" connection. The portions of the cross-section with a radius of curvature of 0.25 inches are so dimensioned to mate with the second preformed hole 82 of the second panel 80, increasing the bearing area at the hole 82. If the shaft 26 of the fastener pin 20 had a perfectly circular cross-section with a diameter of 0.354 inches (thus "matching" the internal cavity 38 of the insert 30), a line load would be applied to the second preformed hole 82 of the second panel 80, which could result in bearing failure of the hole 82 at a lower load state.

In an exemplary method of installing the fastener assembly 10 to join a first and second panel, a first panel with a first preformed hole is provided. An insert is provided that has a head and a sleeve extending from a bottom surface of the head. The insert defines an internal cavity and includes a seat positioned in the internal cavity, and the seat of the insert has a first portion positioned on one side of the internal cavity and a second portion positioned on an opposite side of the internal cavity, with a slot defined between the first portion and the second portion of the seat. The insert is inserted into the first preformed hole of the first panel, such that the head of the insert abuts the first panel, and the sleeve of the insert is positioned in the first preformed hole of the first panel, with a distal end of the sleeve protruding from the first preformed hole of the first panel.

A panel gasket is then positioned adjacent to the first panel with a hole defined through the panel gasket positioned around the distal end of the sleeve. A second panel with a second preformed hole is then provided and positioned adjacent to the first panel with the second preformed hole of the second panel aligned with the first preformed hole of the first panel and the panel gasket positioned between the first and second panels.

A fastener pin having a base and a shaft extending from a top surface of the base and including a tee portion is then provided. A compression member is positioned around the shaft of the fastener pin adjacent to the top surface of the base. The shaft of the fastener pin is inserted into the second preformed hole of the second panel and then into the internal cavity of the insert, such that the tee portion of the shaft of the fastener pin passes through the slot defined between the first and second portions of the seat, and the compression member is compressed between the top surface of the base of the fastener pin and the second panel.

The fastener pin is then rotated one-quarter turn, such that the tee portion of the shaft of the fastener pin is aligned with an engagement surface defined by the first portion of the seat as well as an engagement surface defined by the second portion of the seat. Finally, the fastener pin is released, and the compression member applies a force which biases the tee portion of the fastener pin into engagement with the respective engagement surfaces defined by the first and second portions of the seat of the insert.

Although the above-described fastener assembly 10 has particular applicability and utility in the installation of radome panels, the fastener assembly 10 could also be used to connect any objects having suitable geometries without departing from the spirit and scope of the present invention.

One of ordinary skill in the art will also recognize that additional embodiments and configurations are also possible without departing from the teachings of the present invention or the scope of the claims which follow. This detailed description, and particularly the specific details of the exemplary embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A fastener assembly, comprising:
an insert having a head and a sleeve extending from a bottom surface of the head, said insert defining an internal cavity, and said insert including a seat positioned in the internal cavity;

a fastener pin having a base and a shaft extending from a top surface of the base, said shaft including two or more lateral extensions;
a compression member positioned around the shaft of the fastener pin and adjacent to the top surface of the base of the fastener pin; and
a panel gasket;
wherein the insert is configured for insertion into a first preformed hole of a first panel, such that, in use, the head of the insert abuts the first panel and the sleeve is positioned in the first preformed hole of the first panel with a distal end of the sleeve protruding from the first preformed hole of the first panel;
wherein the fastener pin is configured for insertion into a second preformed hole of a second panel and then into the internal cavity of the insert, such that, in use, the lateral extensions of the shaft of the fastener pin engage the seat of the insert;
wherein, in use, the panel gasket is positioned around the distal end of the sleeve and around the shaft of the fastener pin and between the first panel and the second panel; and
wherein the compression member applies a force which biases the lateral extensions of the shaft of the fastener pin into engagement with the seat to join the first panel and the second panel.

2. A method of installing a fastener assembly to join a first panel and a second panel, comprising the steps of:
providing the first panel with a first preformed hole, said first panel having an upper surface and a lower surface;
providing the second panel with a second preformed hole, said first panel having an upper surface and a lower surface;
aligning the first preformed hole of the first panel with the second preformed hole of the second panel, with the lower surface of the first panel facing the upper surface of the second panel;
providing an insert having a head and a sleeve extending from a bottom surface of the head, said insert defining an internal cavity, and said insert including a seat positioned in the internal cavity, said seat including a first portion and a second portion, with the first portion on one side of the internal cavity and the second portion on an opposite side of the internal cavity, and with a slot defined between the first portion and the second portion of the seat;
inserting the insert into the first preformed hole of the first panel, such that the head of the insert abuts the upper surface of the first panel and the sleeve of the insert is positioned in the first preformed hole of the first panel, with a distal end of the sleeve protruding from the first preformed hole;
positioning a panel gasket around the distal end of the sleeve and between the first panel and the second panel;
providing a fastener pin having a base and a shaft extending from a top surface of the base, said shaft including a tee portion;
positioning a compression member around the shaft of the fastener pin and adjacent to the top surface of the base of the fastener pin;
inserting the shaft of the fastener pin into the second preformed hole of the second panel and then into the sleeve of the insert, such that the tee portion of the shaft of the fastener pin passes through the slot defined between the first portion and the second portion of the seat, and the compression member is compressed between the top surface of the base of the fastener pin and the lower surface of the second panel;
rotating the fastener pin, such that the tee portion of the shaft of the fastener pin is aligned with a first engagement surface defined by the first portion of the seat of the insert and a second engagement surface defined by the second portion of the seat of the insert; and
releasing the fastener pin, such that the compression member applies a force which biases the tee portion of the fastener pin into engagement with the first and second engagement surfaces defined by the first and second portions of the seat of the insert.

3. A fastener assembly, comprising:
an insert having a head and a sleeve extending from a bottom surface of the head, said insert defining an internal cavity, and said insert including a seat positioned in the internal cavity;
a fastener pin having a base and a shaft extending from a top surface of the base, said shalt including a tee portion;
a compression member positioned around the shaft of the fastener pin and adjacent to the top surface of the base of the fastener pin; and
a panel gasket;
wherein the insert is configured for insertion into a first preformed hole of a first panel, such that, in use, the head of the insert abuts the first panel and the sleeve extends through the first preformed hole of the first panel with a distal end of the sleeve protruding from the first preformed hole of the first panel;
wherein, in use, the panel gasket is positioned around the distal end of the sleeve adjacent to the first panel;
wherein the fastener pin is configured for insertion into a second preformed hole of a second panel and then into the internal cavity of the insert, such that, in use, the tee portion of the shaft of the fastener pin engages the seat of the insert; and
wherein the compression member applies a force which biases the tee portion of the fastener pin into engagement with the seat to join the first panel and the second panel.

4. The fastener assembly as recited in claim 3, wherein the seat of the insert includes a first portion and a second portion, with the first portion on one side of the internal cavity and the second portion on an opposite side of the internal cavity, and with a slot defined between the first portion and the second portion of the seat, such that the tee portion of the shaft of the fastener pin can pass through the slot.

5. The fastener assembly as recited in claim 4, wherein each of the first portion and the second portion of the seat defines an engagement surface, such that, in use, after the tee portion of the shaft of the fastener pin passes through the slot defined by the seat, the fastener pin is rotated, and the tee portion is aligned with the respective engagement surfaces defined by the first portion and the second portion of the seat of the insert.

6. The fastener assembly as recited in claim 5, wherein the base of the fastener pin thither comprises two wings that extend from a lower surface of the base, the two wings for facilitating rotation of the fastener pin relative to the insert.

7. The fastener assembly as recited in claim 5, wherein the tee portion of the shaft of the fastener pin has a hexagonal cross-section with six lateral surfaces, and wherein each of the engagement surfaces defined by the first portion and the second portion of the seat includes two ramped portions and a bottom portion extending between the two ramped portions, such that, in use, three of the six lateral surfaces of the tee portion engage the two ramped portions and the bottom portion of each of the engagement surfaces defined by the first portion and the second portion of the seat.

8. The fastener assembly as recited in claim 3, and further comprising a cap configured to fit over the head of the insert.

* * * * *

UNITED STATES PATENT AND TRADEMARK OFFICE
CERTIFICATE OF CORRECTION

PATENT NO. : 9,562,555 B1
APPLICATION NO. : 14/521906
DATED : February 7, 2017
INVENTOR(S) : Casey Aaron Talbot et al.

It is certified that error appears in the above-identified patent and that said Letters Patent is hereby corrected as shown below:

In the Claims

Claim 6, Column 10, Line 59, change "thither" to "further"

Signed and Sealed this
Twenty-third Day of May, 2017

Michelle K. Lee
*Director of the United States Patent and Trademark Office*